(12) United States Patent
Hafizi

(10) Patent No.: US 10,881,586 B1
(45) Date of Patent: Jan. 5, 2021

(54) STUFFED ANIMAL BOTTLE HOLDER APPARATUS

(71) Applicant: Yuliya Hafizi, Lodi, NJ (US)

(72) Inventor: Yuliya Hafizi, Lodi, NJ (US)

( * ) Notice: Subject to any disclaimer, the term of this patent is extended or adjusted under 35 U.S.C. 154(b) by 14 days.

(21) Appl. No.: 16/447,342

(22) Filed: Jun. 20, 2019

(51) Int. Cl.
*A61J 9/00* (2006.01)
*A61J 9/06* (2006.01)
*A47D 15/00* (2006.01)
*A63H 3/00* (2006.01)
*B60N 3/10* (2006.01)
*A63H 3/02* (2006.01)

(52) U.S. Cl.
CPC .......... *A61J 9/0607* (2015.05); *A61J 9/0638* (2015.05); *A61J 9/0661* (2015.05); *A63H 3/003* (2013.01); *A63H 3/02* (2013.01); *B60N 3/103* (2013.01); *A61J 9/06* (2013.01); *A61J 9/0692* (2015.05)

(58) Field of Classification Search
CPC .......... A61J 9/06; A61J 9/0607; A61J 9/0638; A61J 9/0661; A61J 9/0692; A63H 3/003; A63H 3/02; B60N 3/103
See application file for complete search history.

(56) References Cited

U.S. PATENT DOCUMENTS

| | | | |
|---|---|---|---|
| 4,315,654 A | 2/1982 | Crook | |
| 5,489,075 A | 2/1996 | Ible | |
| 5,676,260 A * | 10/1997 | Schneidermesser | A47B 81/068 211/40 |
| 5,871,184 A * | 2/1999 | Kaopio | A61J 9/08 248/102 |
| 5,979,843 A * | 11/1999 | Beck | A61J 9/0669 248/102 |
| 6,003,821 A | 12/1999 | Fabian | |
| 6,386,490 B1 | 5/2002 | Suh | |
| 6,523,792 B2 * | 2/2003 | Fishler | A61J 9/08 248/102 |
| 6,641,094 B2 | 11/2003 | Fishler | |
| 6,739,933 B2 * | 5/2004 | Taylor | A45F 5/00 220/703 |
| 6,824,112 B2 * | 11/2004 | Lange | A61J 9/0607 248/102 |
| 7,213,791 B2 | 5/2007 | Morris | |
| 7,883,391 B1 * | 2/2011 | Asomani | A61J 9/0638 446/28 |
| 2003/0015630 A1 * | 1/2003 | Fishler | A61J 9/0615 248/102 |
| 2010/0224739 A1 | 9/2010 | Allen | |
| 2011/0315832 A1 | 12/2011 | Box | |
| 2012/0322337 A1 * | 12/2012 | Theodory | A63H 3/003 446/73 |

* cited by examiner

*Primary Examiner* — Tan Le

(57) ABSTRACT

A stuffed animal bottle holder apparatus for securing a baby bottle to a car seat or stroller includes a stuffed torso. A pair of hind legs and a head are coupled to the torso. The head has a pair of eyes, a pair of ears, and a nose coupled to a snout portion. The snout portion has a bottle cavity extending into the torso that is configured to receive the baby bottle. A bottle ring is coupled to the head. A pair of arms coupled to the torso and a pair of hands coupled to the pair of arms are used to secure the apparatus to the car seat. Each of the pair of hands comprises a palm and a plurality of fingers coupled to the palm. The torso, the pair of hind legs, the head, the pair of arms, and the pair of hands form a stuffed animal.

14 Claims, 5 Drawing Sheets

STUFFED ANIMAL BOTTLE HOLDER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to bottle holders and more particularly pertains to a new bottle holder for securing a baby bottle to a car seat or stroller.

BRIEF SUMMARY OF THE INVENTION

An embodiment of the disclosure meets the needs presented above by generally comprising a torso that is stuffed. A pair of hind legs and a head are coupled to the torso. The head has a pair of eyes, a pair of ears, and a nose coupled to a snout portion of the head. The snout portion extends from beneath the pair of eyes and has a bottle cavity extending into the torso that is configured to receive a baby bottle. A bottle ring is coupled to the head. The bottle ring is coupled around a perimeter of the bottle cavity and the bottle ring is elasticized and configured to secure the baby bottle within the bottle cavity. A pair of arms is coupled to the torso, and each of the pair of arms has a flexible inner arm tubing and a soft outer arm layer continuously coupled around the inner arm tubing. Each of the pair of arms is flexible such that it can maintain its shape, and each of the pair of arms is configured to wrap around a handle of a car seat or a stroller. A pair of hands is coupled to the pair of arms, and each of the pair of hands comprises a palm and a plurality of fingers coupled to the palm. Each of the fingers has a flexible inner finger tubing and a soft outer finger layer continuously coupled around the inner finger tubing. Each of the fingers is flexible such that it can maintain its shape, and each of the fingers is configured to wrap around the handle. The torso, the pair of hind legs, the head, the pair of arms, and the pair of hands form a stuffed animal.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
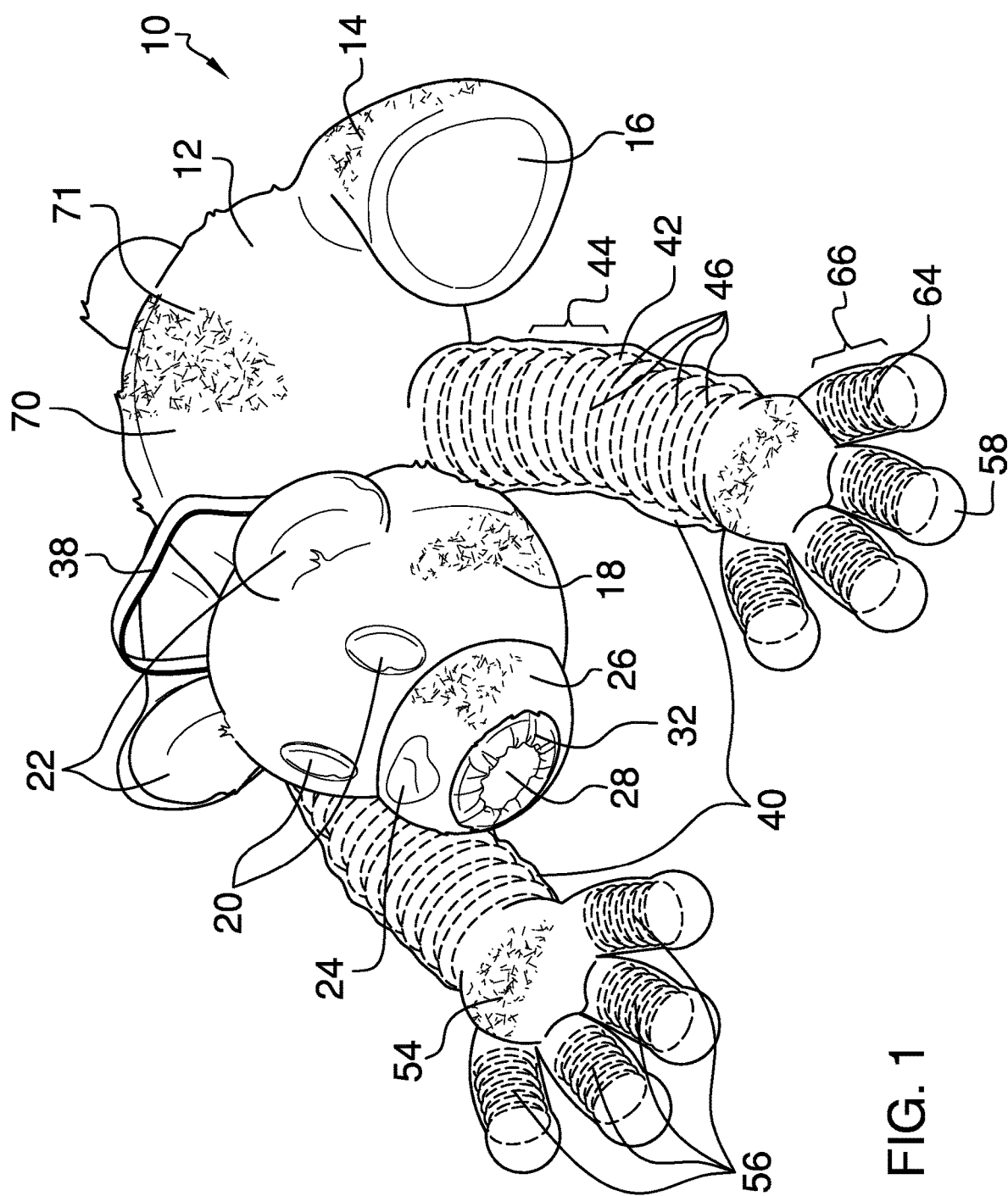
FIG. 1 is an isometric view of a stuffed animal bottle holder apparatus according to an embodiment of the disclosure.
Figure 2:
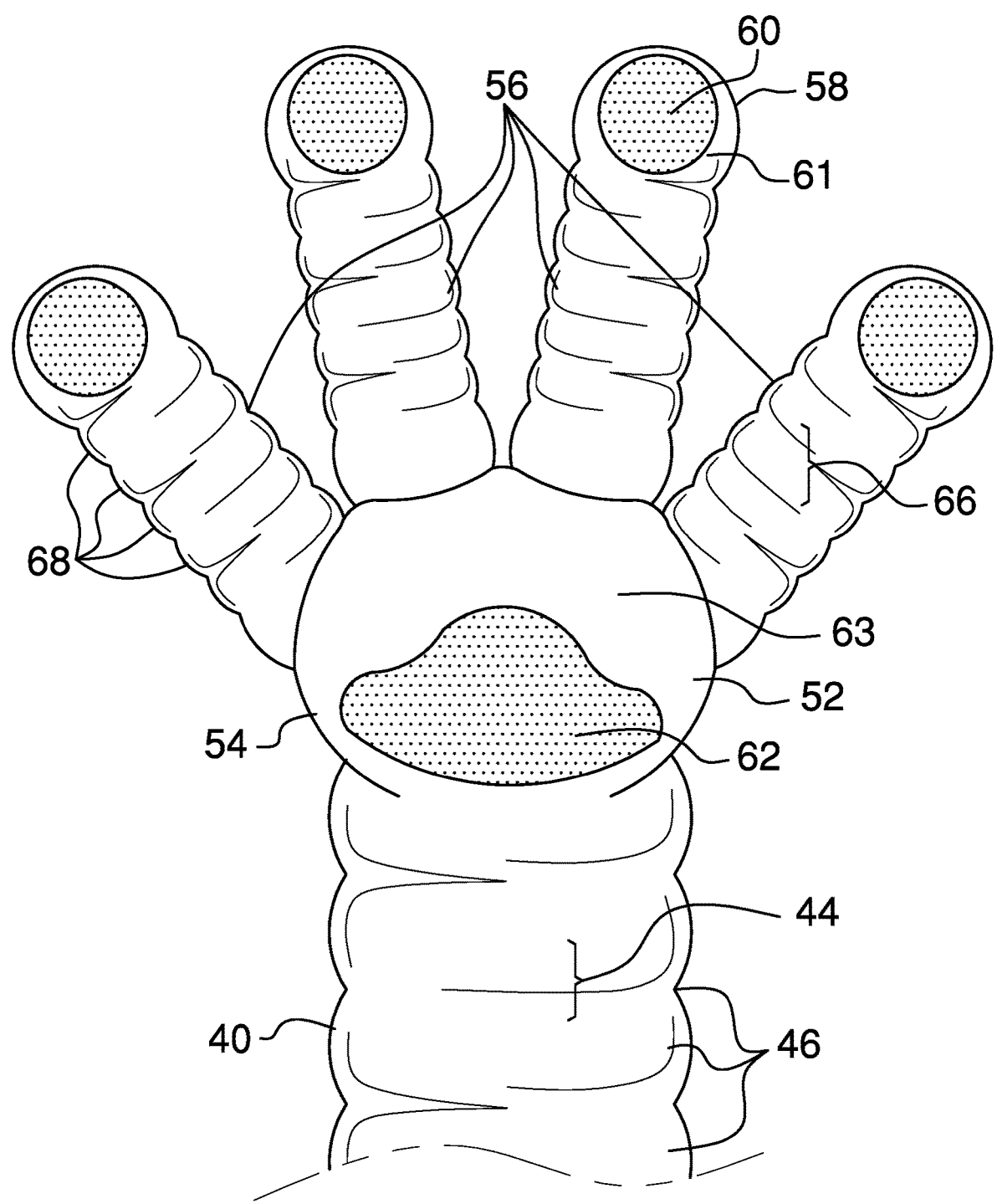
FIG. 2 is a bottom plan view of an embodiment of the disclosure.
Figure 3:
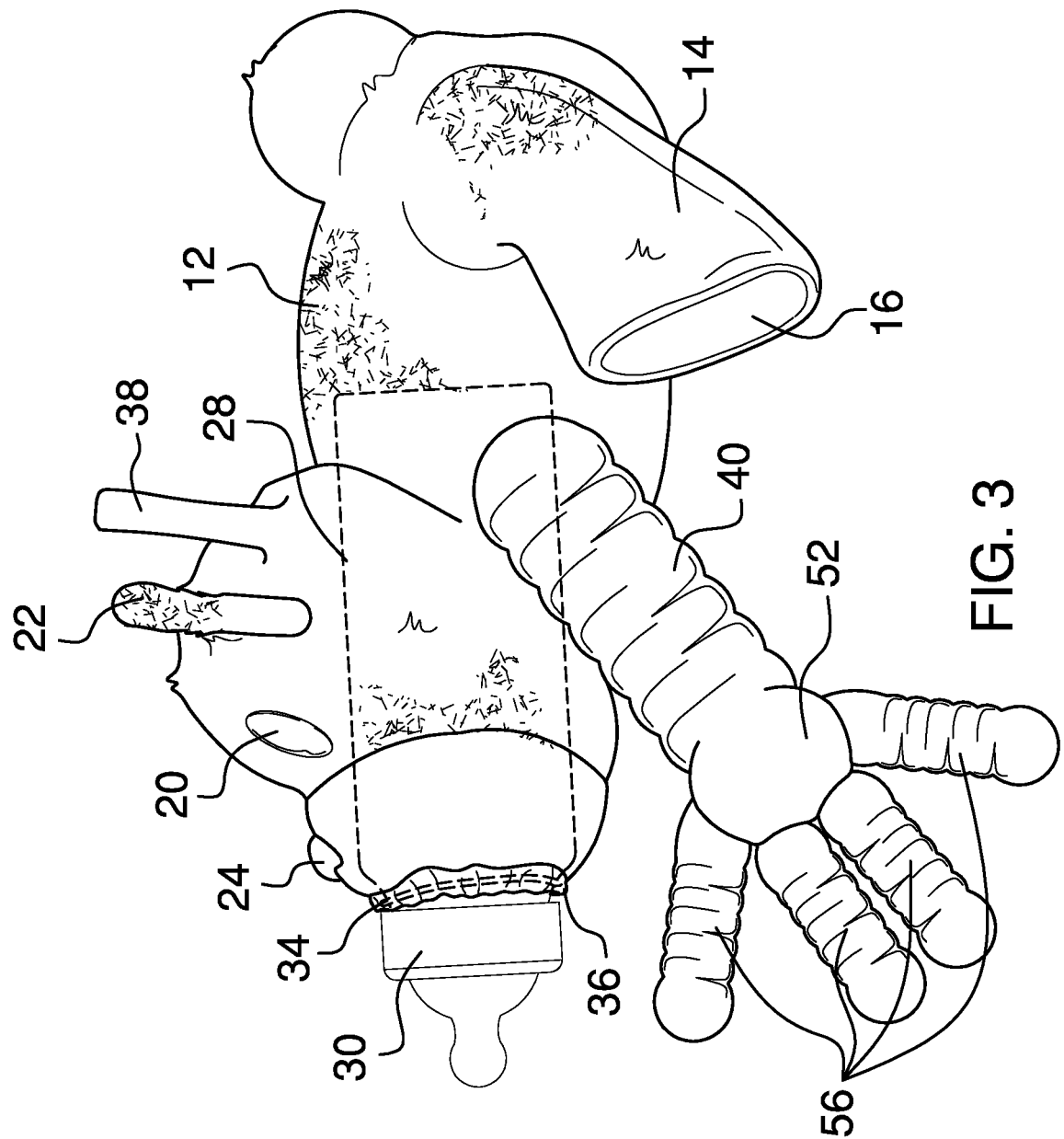
FIG. 3 is a side elevation view of an embodiment of the disclosure.
Figure 4:
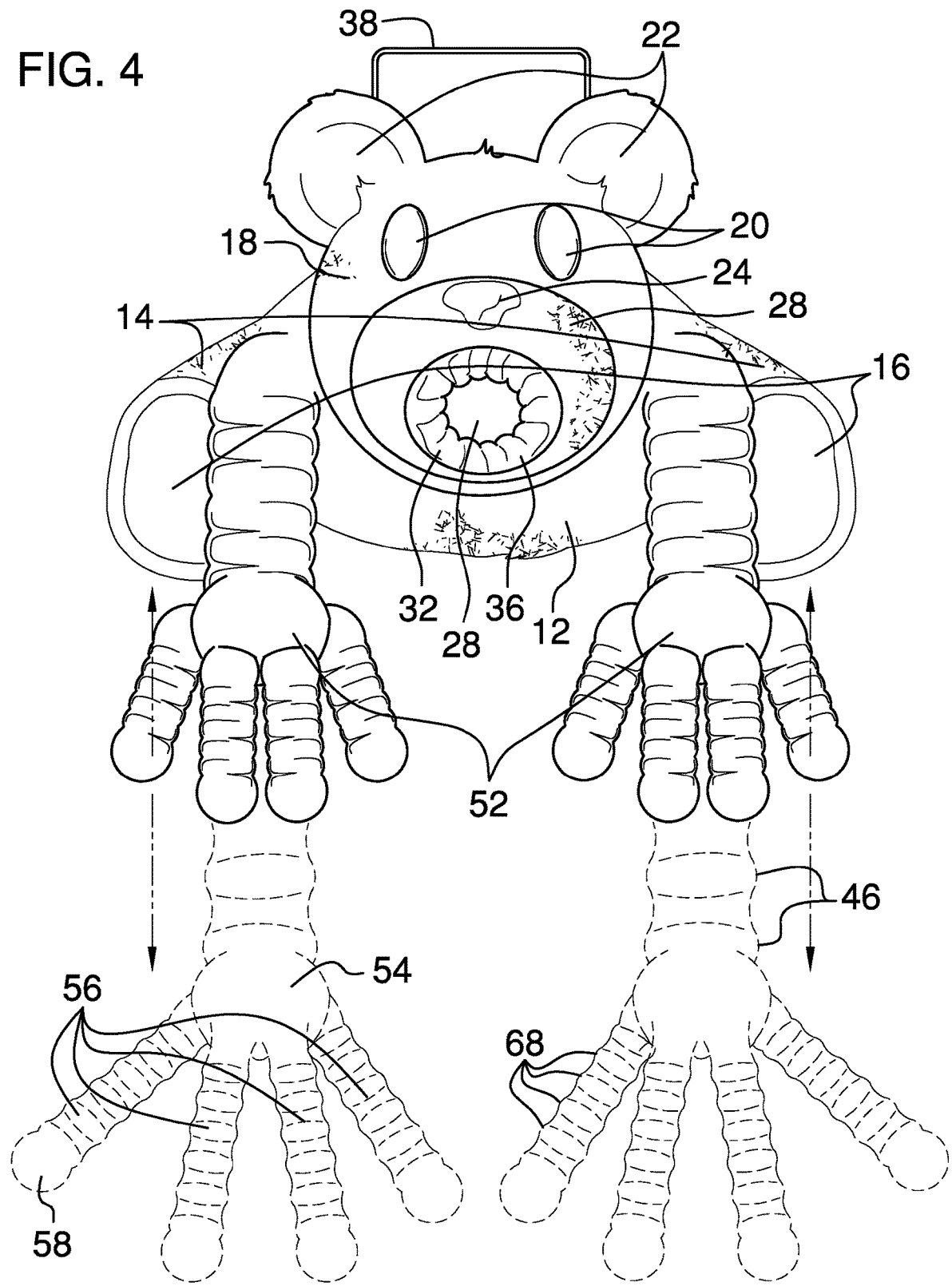
FIG. 4 is a front elevation view of an embodiment of the disclosure.
Figure 5:
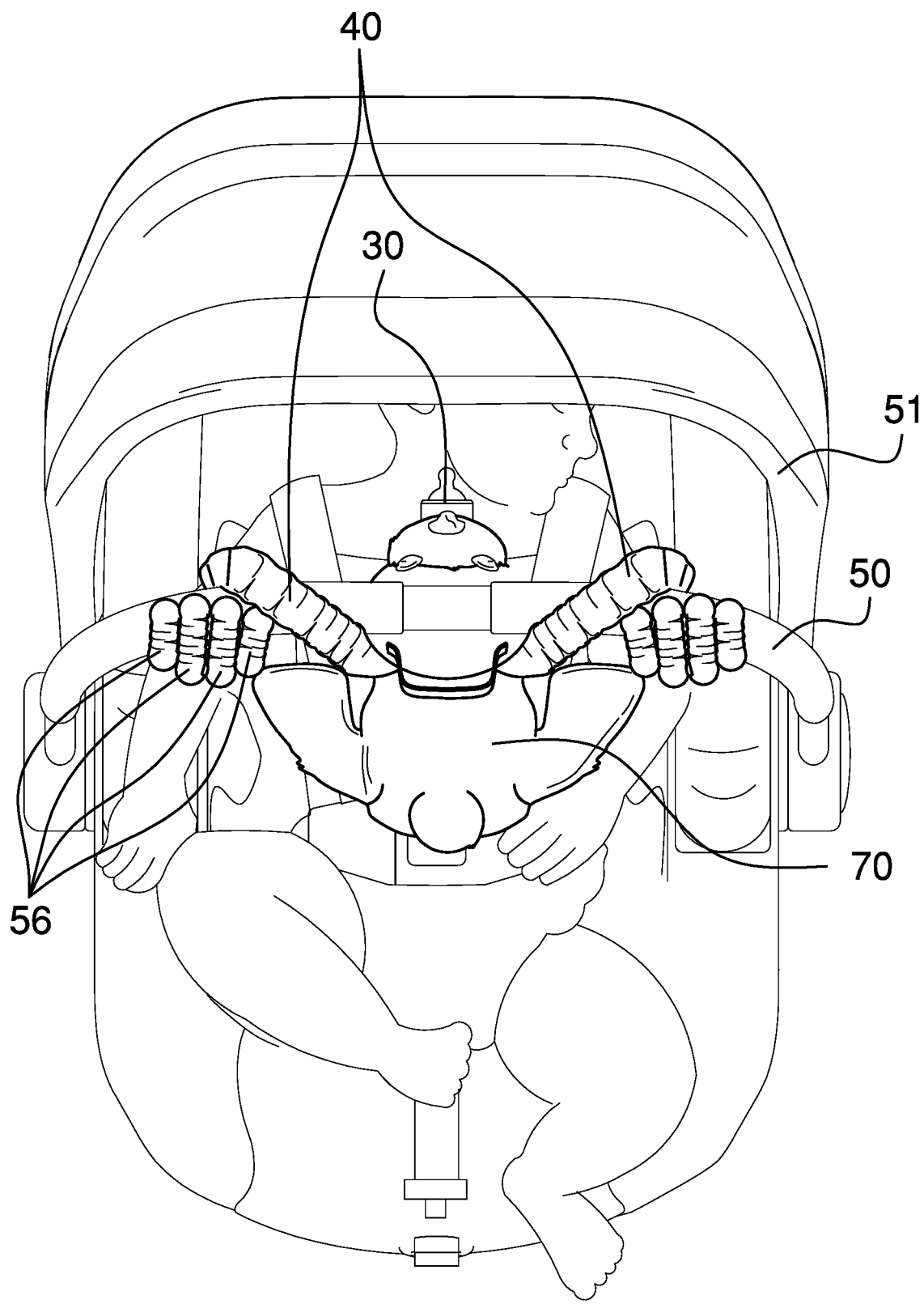
FIG. 5 is an in-use view of an embodiment of the disclosure.

With reference now to the drawings, and in particular to FIGS. 1 through 5 thereof, a new bottle holder embodying the principles and concepts of an embodiment of the disclosure and generally designated by the reference numeral 10 will be described.

As best illustrated in FIGS. 1 through 5, the stuffed animal bottle holder apparatus 10 generally comprises a torso 12 that is stuffed. A pair of hind legs 14 is coupled to the torso 12, and each of the pair of hind legs 14 has a flat back paw portion 16. A head 18 is coupled to the torso 12. The head 18 has a pair of eyes 20, a pair of ears 22, and a nose 24 coupled to a snout portion 26. The snout portion 26 extends from beneath the pair of eyes 20 and has a bottle cavity 28 that extends into the torso 12 and is configured to receive a baby bottle 30. A bottle ring 32 is coupled to the head 18. The bottle ring 32 has an elastic band 34 and a scrunched ring lining 36 continuously covering the elastic band 34. The ring lining 36 is coupled around a perimeter of the bottle cavity 28. The bottle ring 32 is elasticized and configured to secure the baby bottle 30 within the bottle cavity 28. A carry strap 38 is coupled to the head 18 behind the pair of ears 22. A pair of arms 40 is coupled to the torso 12, and each of the pair of arms 40 has a flexible inner arm tubing 42 and a soft outer arm layer 44 continuously coupled around the inner arm tubing 42. The outer arm layer 44 follows the contour of a plurality of arm ridges 46 of the inner arm tubing. The inner arm tubing 42 may be extendable and alternatively compressible gooseneck tubing. Each of the pair of arms 40 is flexible such that it can maintain its shape. Each of the pair of arms 40 is configured to wrap around a handle 50 of a car seat 51 or a stroller to secure the apparatus 10.

A pair of hands 52 is coupled to the pair of arms 40. Each of the pair of hands 52 comprises a palm 54 and a plurality of fingers 56 coupled to the palm 54. Each of the fingers 56 has a rounded tip 58 and a rubberized finger grip 60 coupled to an underside 61 of the tip 58. A rubberized paw grip 62 is coupled to an inside 63 of the palm 54. Each of the fingers 56 has a flexible inner finger tubing 64 and a soft outer finger layer 66 continuously coupled around the inner finger tubing 64. The outer finger layer 66 follows the contour of a plurality of finger ridges 68 of the inner finger tubing 64. The inner finger tubing 64 may also be extendable and alternatively compressible gooseneck tubing. Each of the fingers 56 is flexible such that it can maintain its shape, and each of the fingers 56 is configured to wrap around the handle 50 to further secure the apparatus 10. The finger grips 60, which may be circular, and paw grips 62 help to prevent slippage on the handle 50. The torso 12, the pair of hind legs 14, the head 18, the pair of arms 40, and the pair of hands 52 form a stuffed animal 70. The stuffed animal 70 may be one of a stuffed bear 71, a stuffed cat, or a stuffed monkey. The torso 12, the head 18, and the hind legs 14 may be a plush furry material that is desirable for a child to hold.

In use, the baby bottle 30 is inserted into the torso 12 of the stuffed animal 70. The pair of arms 40 is wrapped and alternatively unwrapped from the handle 50 of the car seat 51 or stroller as desired to hold the baby bottle 30 in place near the child.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A stuffed animal bottle holder apparatus comprising:
a torso, the torso being stuffed;
a pair of hind legs coupled to the torso;
a head coupled to the torso, the head having a pair of eyes, a pair of ears, and a nose coupled to a snout portion, the snout portion extending from beneath the pair of eyes and having a bottle cavity extending into the torso and configured to receive a baby bottle;
a bottle ring coupled to the head, the bottle ring being coupled around a perimeter of the bottle cavity, the bottle ring being elasticized and configured to secure the baby bottle within the bottle cavity;
a pair of arms coupled to the torso, each of the pair of arms having a flexible inner arm tubing and a soft outer arm layer continuously coupled around the inner arm tubing, each of the pair of arms being flexible such that it can maintain its shape, each of the pair of arms being configured to wrap around a handle of a car seat or a stroller; and
a pair of hands coupled to the pair of arms, each of the pair of hands comprising a palm and a plurality of fingers coupled to the palm, each of the fingers having a flexible inner finger tubing and a soft outer finger layer continuously coupled around the inner finger tubing, each of the fingers being flexible such that it can maintain its shape, each of the fingers being configured to wrap around the handle;
wherein the torso, the pair of hind legs, the head, the pair of arms, and the pair of hands form a stuffed animal.

2. The stuffed animal bottle holder apparatus of claim 1 further comprising the inner arm tubing and the inner finger tubing being extendable and alternatively compressible.

3. The stuffed animal bottle holder apparatus of claim 2 further comprising the inner arm tubing and the inner finger tubing being gooseneck tubing.

4. The stuffed animal bottle holder apparatus of claim 3 further comprising the outer arm layer following the contour of a plurality of arm ridges of the inner arm tubing, the outer finger layer following the contour of a plurality of finger ridges of the inner finger tubing.

5. The stuffed animal bottle holder apparatus of claim 1 further comprising each of the fingers having a rounded tip, a finger grip being coupled to an underside of the tip.

6. The stuffed animal bottle holder apparatus of claim 5 further comprising a paw grip being coupled to an inside of the palm.

7. The stuffed animal bottle holder apparatus of claim 6 further comprising each of the finger grips and each of the paw grips being rubberized.

8. The stuffed animal bottle holder apparatus of claim 1 further comprising the bottle ring having an elastic band and a scrunched ring lining continuously covering the elastic band, the ring lining being coupled around the perimeter of the bottle cavity.

9. The stuffed animal bottle holder apparatus of claim 1 further comprising a carry strap coupled to the head, the carry strap being coupled behind the pair of ears.

10. The stuffed animal bottle holder apparatus of claim 1 further comprising each of the pair of hind legs having a flat back paw portion.

11. The stuffed animal bottle holder apparatus of claim 1 further comprising the stuffed animal being a stuffed bear.

12. The stuffed animal bottle holder apparatus of claim 1 further comprising the stuffed animal being a stuffed cat.

13. The stuffed animal bottle holder apparatus of claim 1 further comprising the stuffed animal being a stuffed monkey.

14. A stuffed animal bottle holder apparatus comprising:
a torso, the torso being stuffed;
a pair of hind legs coupled to the torso, each of the pair of hind legs having a flat back paw portion;
a head coupled to the torso, the head having a pair of eyes, a pair of ears, and a nose coupled to a snout portion, the snout portion extending from beneath the pair of eyes and having a bottle cavity extending into the torso and configured to receive a baby bottle;
a bottle ring coupled to the head, the bottle ring having an elastic band and a scrunched ring lining continuously covering the elastic band, the ring lining being coupled around a perimeter of the bottle cavity, the bottle ring being elasticized and configured to secure the baby bottle within the bottle cavity;

a carry strap coupled to the head, the carry strap being coupled behind the pair of ears;

a pair of arms coupled to the torso, each of the pair of arms having a flexible inner arm tubing and a soft outer arm layer continuously coupled around the inner arm tubing, the outer arm layer following the contour of a plurality of arm ridges of the inner arm tubing, the inner arm tubing being extendable and alternatively compressible gooseneck tubing, each of the pair of arms being flexible such that it can maintain its shape, each of the pair of arms being configured to wrap around a handle of a car seat or a stroller; and a pair of hands coupled to the pair of arms, each of the pair of hands comprising a palm and a plurality of fingers coupled to the palm, each of the fingers having a rounded tip and a rubberized finger grip coupled to an underside of the tip, a rubberized paw grip being coupled to an inside of the palm, each of the fingers having a flexible inner finger tubing and a soft outer finger layer continuously coupled around the inner finger tubing, the outer finger layer following the contour of a plurality of finger ridges of the inner finger tubing, the inner finger tubing being extendable and alternatively compressible gooseneck tubing, each of the fingers being flexible such that it can maintain its shape, each of the fingers being configured to wrap around the handle;

wherein the torso, the pair of hind legs, the head, the pair of arms, and the pair of hands form a stuffed animal, the stuffed animal being one of a stuffed bear, a stuffed cat, or a stuffed monkey.

* * * * *